United States Patent
Wang et al.

(10) Patent No.: US 8,089,238 B2
(45) Date of Patent: Jan. 3, 2012

(54) ELECTRONIC DEVICE AND MONITOR OPENING MECHANISM FOR AN ELECTRONIC DEVICE

(75) Inventors: Chih-Yi Wang, Taipei Hsien (TW); Cheng-Hung Lin, Taipei Hsien (TW); Tzu-Jai Lee, Taipei Hsien (TW)

(73) Assignee: Wistron Corp., New Taipei (TW)

( * ) Notice: Subject to any disclaimer, the term of this patent is extended or adjusted under 35 U.S.C. 154(b) by 410 days.

(21) Appl. No.: 12/481,462

(22) Filed: Jun. 9, 2009

(65) Prior Publication Data

US 2010/0090622 A1    Apr. 15, 2010

(30) Foreign Application Priority Data

Oct. 9, 2008 (TW) ............................. 97138936 A

(51) Int. Cl.
*G05B 19/40* (2006.01)
(52) U.S. Cl. ........................................ 318/685; 318/696
(58) Field of Classification Search ............... 318/685, 318/696
See application file for complete search history.

(56) References Cited

U.S. PATENT DOCUMENTS

| | | | | |
|---|---|---|---|---|
| 6,262,885 B1 * | 7/2001 | Emma et al. | ............ | 361/679.05 |
| 6,392,877 B1 * | 5/2002 | Iredale | ............ | 361/679.05 |
| 6,827,409 B2 * | 12/2004 | Michael | ............ | 312/223.3 |
| 2003/0001795 A1 * | 1/2003 | Stasko | ............ | 345/1.1 |
| 2006/0082518 A1 * | 4/2006 | Ram | ............ | 345/1.1 |
| 2008/0186660 A1 * | 8/2008 | Yang | ............ | 361/681 |
| 2009/0102744 A1 * | 4/2009 | Ram | ............ | 345/1.1 |
| 2010/0020182 A1 * | 1/2010 | Wang et al. | ............ | 348/207.1 |

* cited by examiner

*Primary Examiner* — Rina Duda

(57) ABSTRACT

A monitor opening mechanism includes a first rotating shaft rotatably connected to a host and having a first toothed portion. A stepper motor is disposed in the host and includes a second rotating shaft having a second toothed portion engaging the first toothed portion. A fine-tuning control circuit board is electrically connected to the stepper motor. A first fine-tuning key is electrically connected to the fine-tuning control circuit board. When the first fine-tuning key is operated, the fine-tuning control circuit board drives the second rotating shaft to rotate, forcing the monitor to rotate with respect to the host in a first direction. A second fine-tuning key is electrically connected to the fine-tuning control circuit board. When the second fine-tuning key is operated, the fine-tuning control circuit board drives the second rotating shaft to rotate, forcing the monitor to rotate with respect to the host in a second direction.

5 Claims, 7 Drawing Sheets

ELECTRONIC DEVICE AND MONITOR OPENING MECHANISM FOR AN ELECTRONIC DEVICE

CROSS REFERENCE TO RELATED APPLICATIONS

This Application claims priority of Taiwan Patent Application No. 97138936, filed on Oct. 9, 2008, the entirety of which is incorporated by reference herein.

BACKGROUND OF THE INVENTION

1. Field of the Invention

The invention relates to an electronic device, and more particularly to a monitor opening mechanism for an electronic device with enhanced operational convenience.

2. Description of the Related Art

In a conventional electronic device, an opened angle of a monitor thereof is adjusted by a user's hands, thus causing inconvenience of operation.

Hence, there is a need for an electronic device and a monitor opening mechanism for an electronic device with functions of arbitrarily adjusting an opened angle of a monitor thereof, enhancing operational convenience.

BRIEF SUMMARY OF THE INVENTION

A detailed description is given in the following embodiments with reference to the accompanying drawings.

An exemplary embodiment of the invention provides an electronic device comprising a host, a monitor, a stepper motor, a fine-tuning control circuit board, a first fine-tuning key, and a second fine-tuning key. The monitor comprises a first rotating shaft rotatably connected to the host and comprising a first toothed portion. The stepper motor is disposed in the host and comprises a second rotating shaft comprising a second toothed portion engaging the first toothed portion. The fine-tuning control circuit board is electrically connected to the stepper motor. The first fine-tuning key is electrically connected to the fine-tuning control circuit board. When the first fine-tuning key is operated, the fine-tuning control circuit board drives the second rotating shaft to rotate, forcing the monitor to rotate with respect to the host in a first direction. The second fine-tuning key is electrically connected to the fine-tuning control circuit board. When the second fine-tuning key is operated, the fine-tuning control circuit board drives the second rotating shaft to rotate, forcing the monitor to rotate with respect to the host in a second direction.

Another exemplary embodiment of the invention provides a monitor opening mechanism for an electronic device. The monitor opening mechanism comprises a first rotating shaft, a stepper motor, a fine-tuning control circuit board, a first fine-tuning key, and a second fine-tuning key. The first rotating shaft is disposed in a monitor, is rotatably connected to a host, and comprises a first toothed portion. The stepper motor is disposed in the host and comprises a second rotating shaft comprising a second toothed portion engaging the first toothed portion. The fine-tuning control circuit board is electrically connected to the stepper motor. The first fine-tuning key is electrically connected to the fine-tuning control circuit board. When the first fine-tuning key is operated, the fine-tuning control circuit board drives the second rotating shaft to rotate, forcing the monitor to rotate with respect to the host in a first direction. The second fine-tuning key is electrically connected to the fine-tuning control circuit board. When the second fine-tuning key is operated, the fine-tuning control circuit board drives the second rotating shaft to rotate, forcing the monitor to rotate with respect to the host in a second direction.

The electronic device or monitor opening mechanism further comprises a torsion spring connected between the host and the monitor.

According to the electronic device or monitor opening mechanism, the torsion spring is fit on the first rotating shaft.

According to the electronic device or monitor opening mechanism, the host comprises a button, an engaging member, and a spring, the monitor further comprises a hook, the engaging member is connected between the button and the spring, and the hook is detachably engaged with the engaging member.

According to the electronic device or monitor opening mechanism, the electronic device comprises a notebook computer, a translator, or a personal digital assistant.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
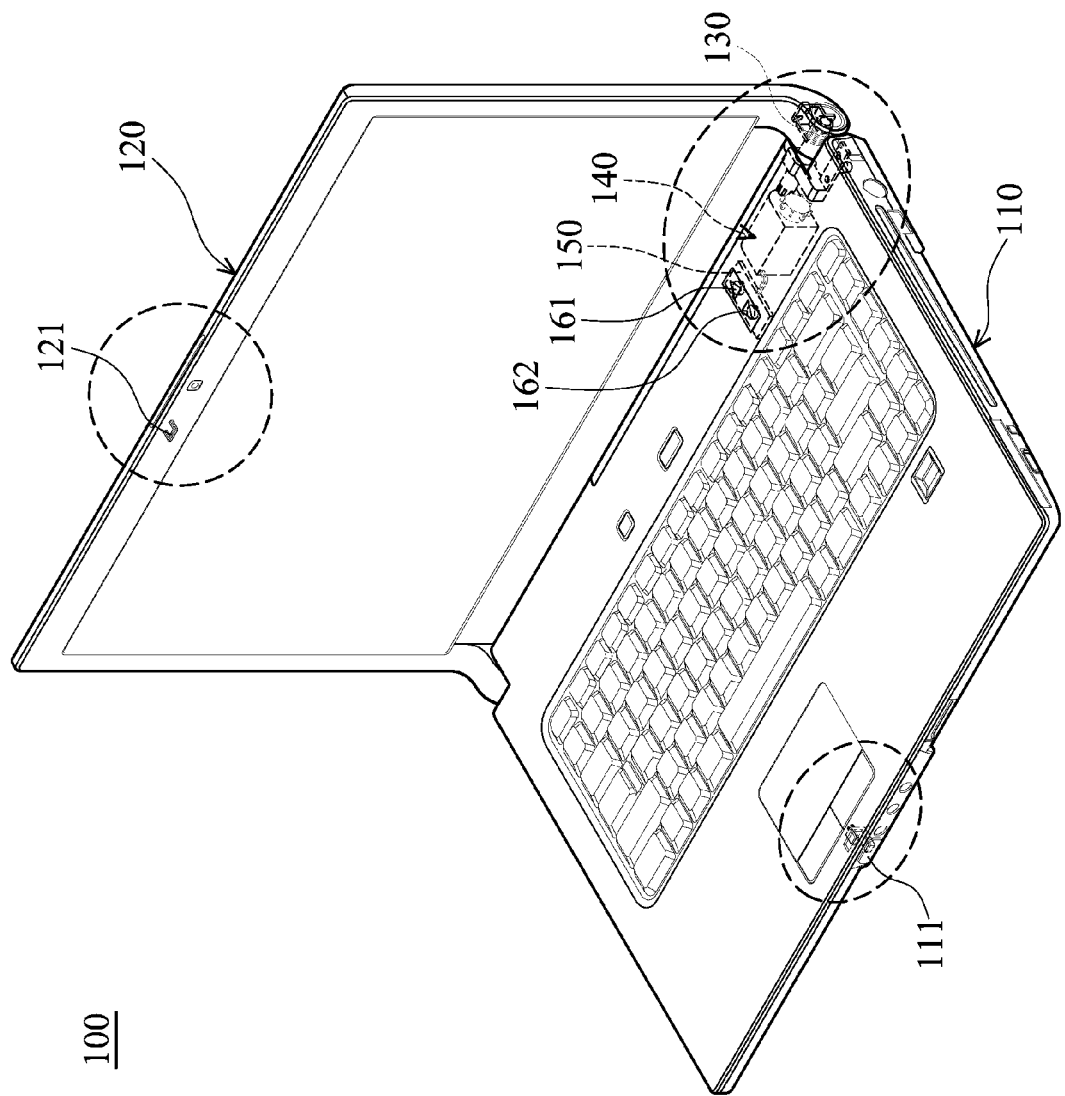
FIG. 1A is a schematic perspective view of an electronic device of an embodiment of the invention in an opened status.

FIG. 1A is a schematic perspective view of an electronic device of an embodiment of the invention in an opened status. The electronic device 100 may be a notebook computer, a translator, or a personal digital assistant (PDA) and comprises a host 110, a monitor 120, a torsion spring 130, a stepper motor 140, a fine-tuning control circuit board 150, a first fine-tuning key 161, and a second fine-tuning key 162.

Figure 2:
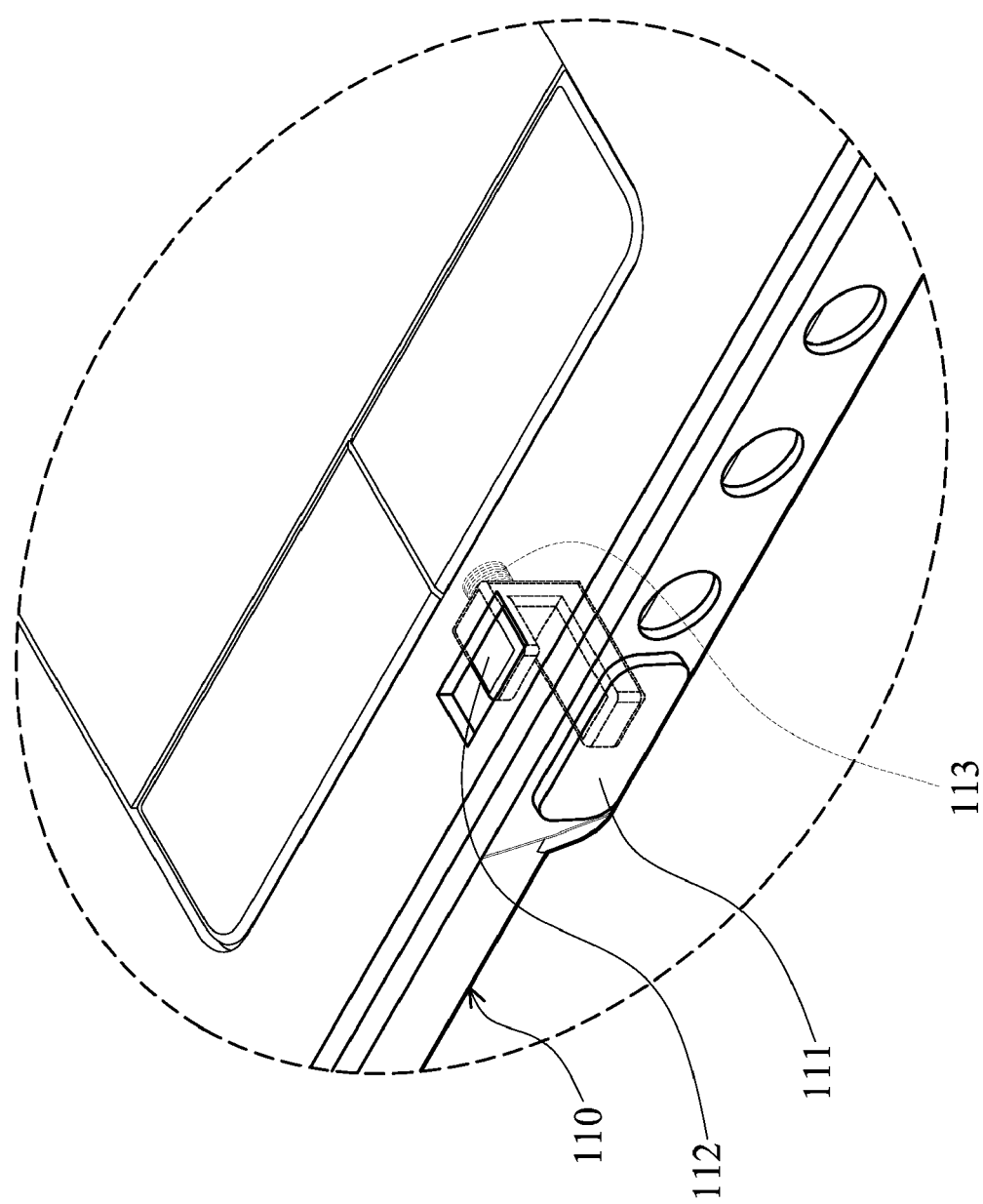
FIG. 2 is a schematic partial view of an electronic device of an embodiment of the invention.

FIG. 2 is a schematic partial view of an electronic device of an embodiment of the invention. The host 110 comprises a button 111, an engaging member 112, and a spring 113. Here, the engaging member 112 is connected between the button 111 and the spring 113.

Figure 3:
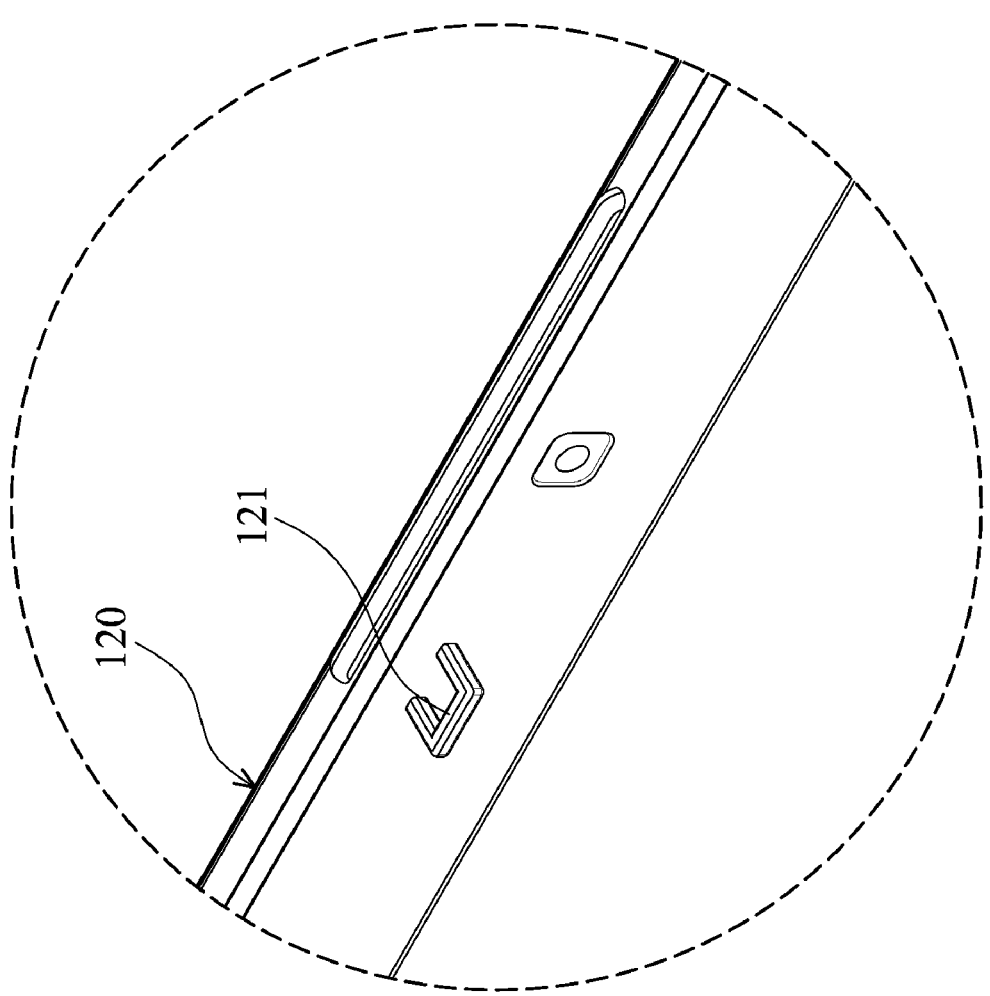
FIG. 3 is another schematic partial view of an electronic device of an embodiment of the invention.
Figure 4:
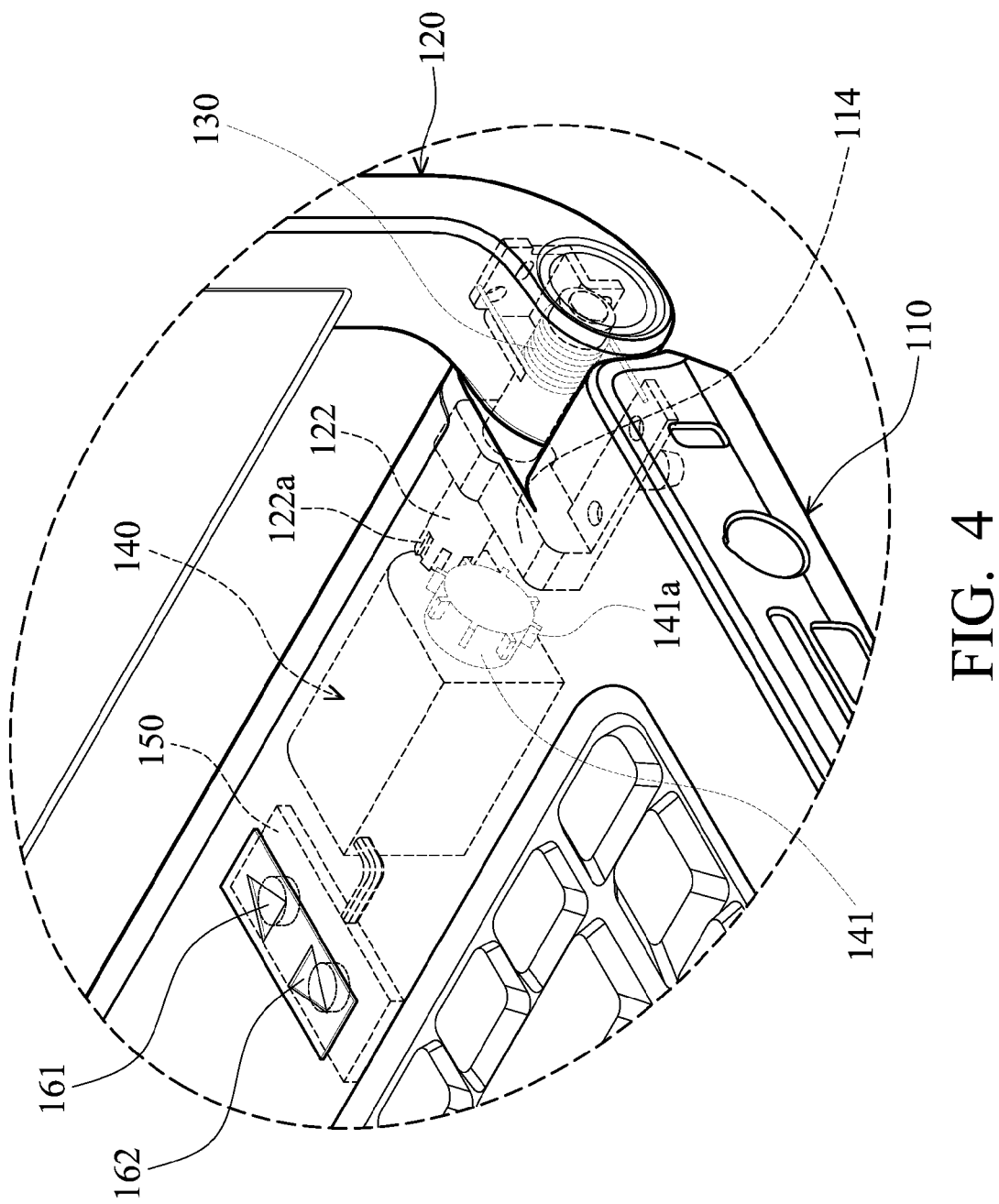
FIG. 4 is yet another schematic partial view of an electronic device of an embodiment of the invention.

FIG. 3 is another schematic partial view of an electronic device of an embodiment of the invention. FIG. 4 is yet another schematic partial view of an electronic device of an embodiment of the invention. The monitor 120 may be an LCD monitor and comprises a hook 121 and a first rotating shaft 122. The hook 121 is detachably engaged with the engaging member 112 of the host 110. As shown in FIG. 4, the first rotating shaft 122 is rotatably connected to the host 110 and comprises a first toothed portion 122a. Specifically, the first rotating shaft 122 is fit in a fixed member 114 of the host 110, rotating with respect thereto. Additionally, the first toothed portion 122a comprises a plurality of teeth.

As shown in FIG. 4, the torsion spring 130 is fit on the first rotating shaft 122 of the monitor 120 and is connected between the host 110 and the monitor 120.

The stepper motor 140 is disposed in the host 110 and comprises a second rotating, shaft 141. Here, the second rotating shaft 141 comprises a second toothed portion 141a engaging the first toothed portion 122a of the first rotating shaft 122. Additionally, the second toothed portion 141a comprises a plurality of teeth.

The fine-tuning control circuit board 150 is electrically connected to the stepper motor 140. In this embodiment, the fine-tuning control circuit board 150 is disposed in the host 110.

The first fine-tuning key 161 and second fine-tuning key 162 are electrically connected to the fine-tuning control circuit board 150, respectively driving the second rotating, shaft 141 of the stepper motor 140 to rotate in a counterclockwise direction and a clockwise direction.

The following description is directed to opening operation of the monitor 120 of the electronic device 100 and adjustment of an opened angle of the monitor 120.

Figure 5:
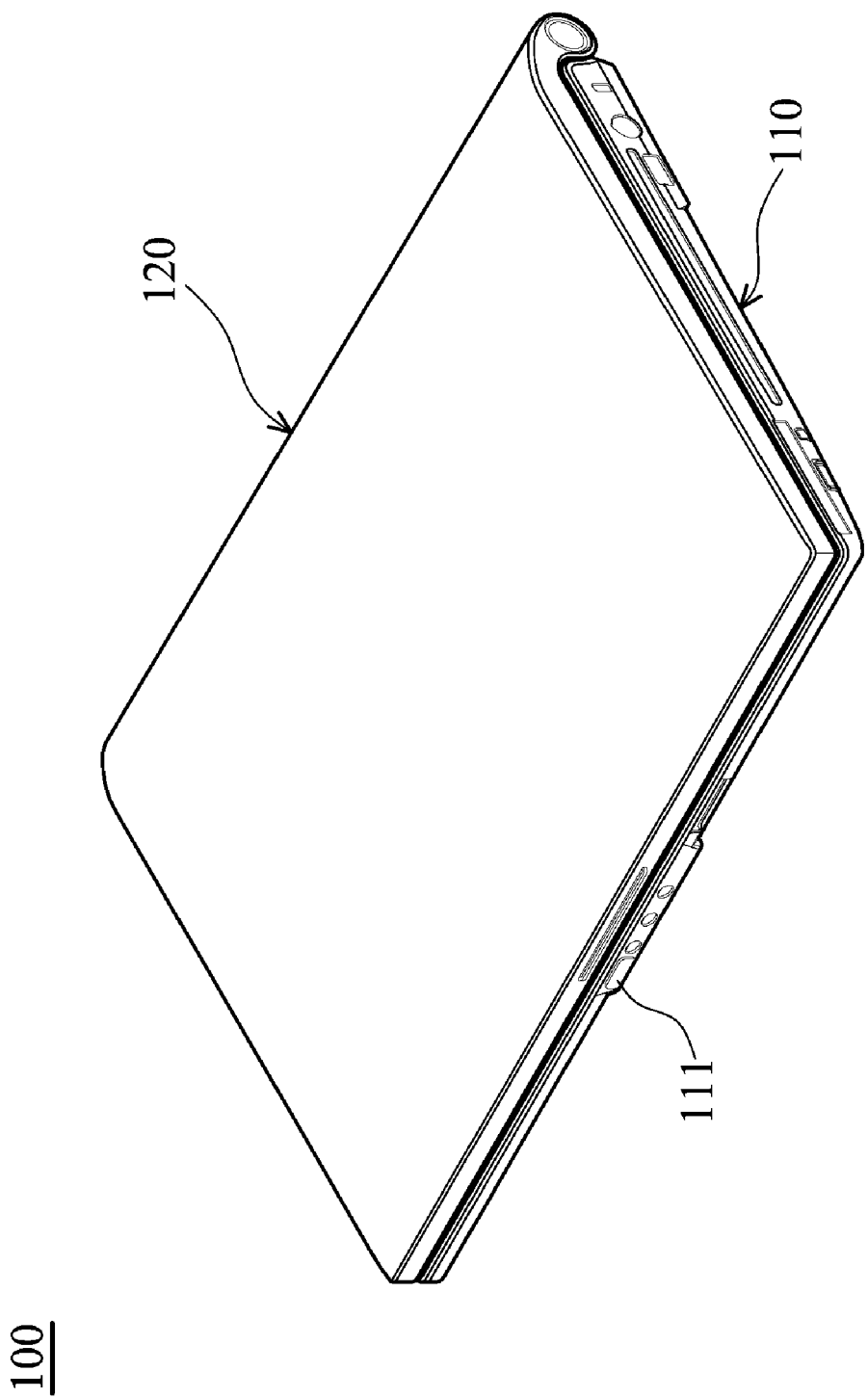
FIG. 5 is a schematic perspective view of an electronic device of an embodiment of the invention in a closed status.

FIG. 5 is a schematic perspective view of an electronic device of an embodiment of the invention in a closed status. When the monitor 120 is closed to the host 110, the hook 121 of the monitor 120 is engaged with the engaging member 112 of the host 110 (as shown in FIG. 2 and FIG. 3). At this point, the torsion spring 130 connected between the host 110 and the monitor 120 is twisted, thereby providing restoring resilience. An operator can then press the button 111 of the host 110, enabling the monitor 120 to open from the host 110. Here, when pressed, the button 111 forces the engaging member 112 to move toward the interior of the host 110 and to compress the spring 113. Thus, the hook 121 of the monitor 120 disengages from the engaging member 112 moving toward the interior of the host 110. At this point, the monitor 120 is automatically rotated and opened at a specific angle or to a specific position by the restoring resilience provided by the torsion spring 130, as shown in FIG. 1A. Moreover, after the button 111 is released, the engaging member 112 returns to its original position by restoring resilience provided by the spring 113.

Figure 1B:
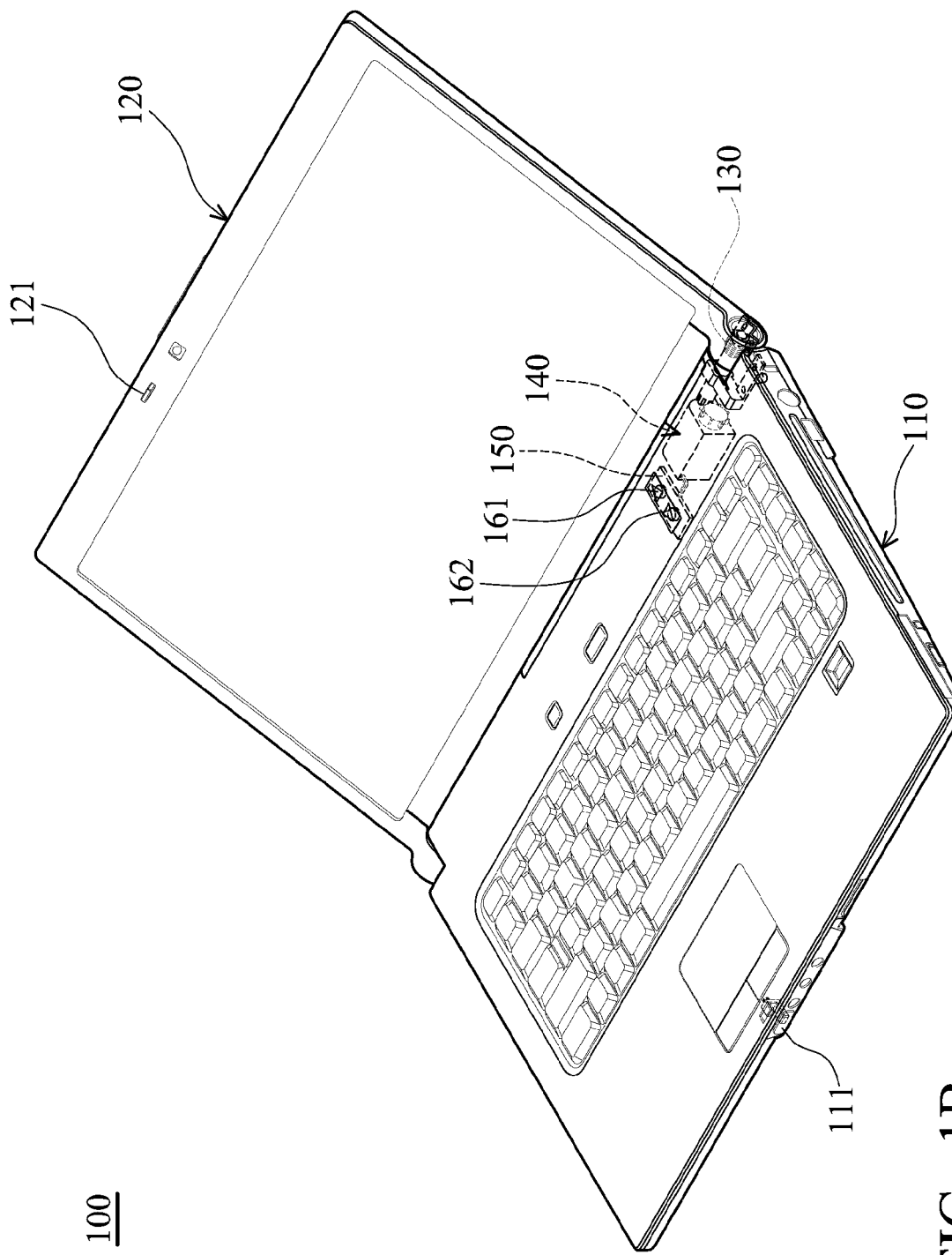
FIG. 1B is a schematic perspective view of an electronic device of an embodiment of the invention in another opened status.
Figure 1C:
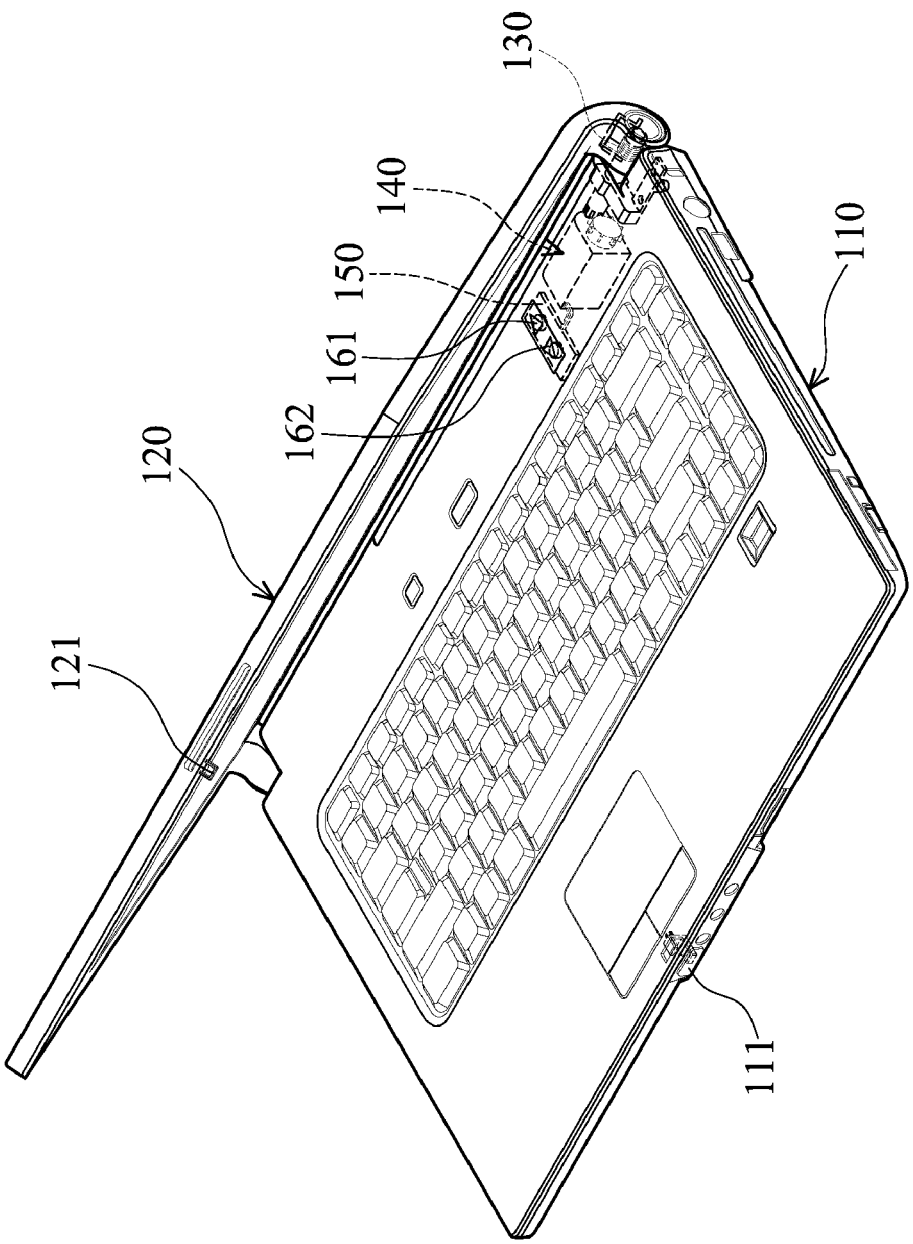
FIG. 1C is a schematic perspective view of an electronic device of an embodiment of the invention in yet another opened status.

In another aspect, when the automatically opened angle or position of the monitor 120 is not desirable, the first fine-tuning key 161 or second fine-tuning key 162 can be operated to adjust the opened angle or position of the monitor 120 with respect to the host 110. Specifically, as shown in FIG. 4, when the first fine-tuning key 161 is operated (or pressed), the fine-tuning control circuit board 150 outputs a signal to drive the second rotating shaft 141 of the stepper motor 140 to rotate in the counterclockwise direction. Here, as the second toothed portion 141a of the second rotating shaft 141 engages the first toothed portion 122a of the first rotating shaft 122, the second rotating shaft 141 rotating in the counterclockwise direction drives the first rotating shaft 122 to rotate in the clockwise direction, thereby forcing the monitor 120 to rotate with respect to the host 110 in the clockwise direction (first direction), until the first fine-tuning key 161 is released, as shown in FIG. 1B. Here, FIG. 1B is a schematic perspective view of an electronic device of an embodiment of the invention in another opened status. On the other hand, as shown in FIG. 4, when the second fine-tuning key 162 is operated (or pressed), the fine-tuning control circuit board 150 outputs another signal to drive the second rotating shaft 141 of the stepper motor 140 to rotate in the clockwise direction. Here, the second rotating shaft 141 rotating in the clockwise direction drives the first rotating shaft 122 to rotate in the counterclockwise direction, thereby forcing the monitor 120 to rotate with respect to the host 110 in the counterclockwise direction (second direction), until the second fine-tuning key 162 is released, as shown in FIG. 1C. Here, FIG. 1C is a schematic perspective view of an electronic device of an embodiment of the invention in yet another opened status.

Accordingly, by operating (or pressing) the first fine-tuning key 161 or second fine-tuning key 162 using only one finger, the operator can arbitrarily adjust the opened angle or position of the monitor 120. Thus, operational convenience of the electronic device 100 can be enhanced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a host;
   a monitor comprising a first rotating shaft rotatably connected to the host and comprising a first toothed portion;
   a stepper motor disposed in the host and comprising a second rotating shaft comprising a second toothed portion engaging the first toothed portion;
   a fine-tuning control circuit board electrically connected to the stepper motor;
   a first fine-tuning key electrically connected to the fine-tuning control circuit board, wherein, when the first fine-tuning key is operated, the fine-tuning control circuit board drives the second rotating shaft to rotate, forcing the monitor to rotate with respect to the host in a first direction; and
   a second fine-tuning key electrically connected to the fine-tuning control circuit board, wherein, when the second fine-tuning key is operated, the fine-tuning control circuit board drives the second rotating shaft to rotate, forcing the monitor to rotate with respect to the host in a second direction.

2. The electronic device as claimed in claim 1, further comprising a torsion spring connected between the host and the monitor.

3. The electronic device as claimed in claim 2, wherein the torsion spring is fit on the first rotating shaft.

4. The electronic device as claimed in claim 1, wherein the host comprises a button, an engaging member, and a spring, the monitor further comprises a hook, the engaging member is connected between the button and the spring, and the hook is detachably engaged with the engaging member.

5. The electronic device as claimed in claim 1, wherein the electronic device comprises a notebook computer, a translator, or a personal digital assistant.

* * * * *